United States Patent [19]

Banford

[11] 3,780,737

[45] Dec. 25, 1973

[54] A METHOD OF TREATING BOVINE MASTITIS BY MEANS OF AN ERYTHROMYCIN SOLUTION

[75] Inventor: John Alexander Banford, Lake, Ill.

[73] Assignee: Abbott Laboratories, North Chicago, Ill.

[22] Filed: Mar. 9, 1971

[21] Appl. No.: 122,499

Related U.S. Application Data

[63] Continuation-in-part of Ser. Nos. 562,107, July 1, 1966, abandoned, and Ser. No. , , Continuation of Ser. No. 720,452, April 11, 1968, abandoned.

[52] U.S. Cl. .................................. 128/260, 424/181
[51] Int. Cl. ............................................ A61m 31/00
[58] Field of Search ....................... 424/181; 128/260

[56] References Cited
UNITED STATES PATENTS 3,013,941 12/1961 Gunderson .......................... 424/181
3,135,658 6/1964 Hanus et al. ........................ 424/181
3,144,386 8/1964 Brightenback ...................... 424/181
3,347,743 10/1967 Reuter et al. ....................... 424/181

Primary Examiner—Albert T. Meyers
Assistant Examiner—Daren M. Stephens
Attorney—Robert L. Niblack

[57] ABSTRACT

A method of treating bovine mastitis by injecting through the teat orifice of an infected quarter a solution of erythromycin in a fatty acid triglyceride having an iodine value of less than 42. This method, by virtue of the unique solution offers not only effective mastitis control, but also the distinct advantage of a shorter period of detactable drug residue in the milk than heretofore obtainable. Milk taken after the third milking following the last treatment is free from detectable erythromycin residue.

4 Claims, No Drawings

A METHOD OF TREATING BOVINE MASTITIS BY MEANS OF AN ERYTHROMYCIN SOLUTION

This is a continuation-in-part of Ser. No. 562,107 filed July 1, 1966, now abandoned; and continuation of my pending application, Ser. No. 720,452, filed Apr. 11, 1968 and now abandoned.

This invention relates to a method for treating infectious bovine mastitis with a medicinal preparation containing erythromycin base. More particularly, this invention relates to the administration of stabilized erythromycin base solution into the infected area by injection through the teat orifice of an infected udder quarter.

The mode of treatment of the present invention is especially effective against the causative organisms of more than 90 percent of the infections caused by *Staphylococcus aureus, Streptococcus agalactiae, Streptococcus dysgalacliae,* and *Streptococcus uberis.* It has further been found that the method of this invention is effective in eliminating both the clinical signs and the pathogenic bacteria associated with mastitis caused by the above organisms. It should nevertheless be understood that infectious mastitis, as that term is used herein, is meant to describe non-specific infections causing inflammation of the mammary tissue in bovine species. To that end infections, especially gram-positive bacterial infections, caused by organisms susceptible to erythromycin can be treated by the method of this invention. Furthermore, when the method of this invention is practiced, less than 10% of the total dose of erythromycin is recovered in excreted milk. As shall be seen later this is because the erythromycin is absorbed into the mammary tissue. This is especially important since Staphlococcus organisms tend to infect the interstitial mammary tissue. Unless there is good absorption, the site of infection will not be reached.

Hence, one of the primary objects of this invention is to provide a method for treating infectious mastitis that does not require disposing as waste that milk excreted long after treatment. Regulations provide that milk contaminated with any antibiotic shall not be used for human consumption. With prior modes of treatment, milk taken as long as 96 hours following the last installation of drug contained sufficient antibiotic to require discarding that milk.

Now it has been found that by practicing the method of this invention, there is provided milk free from drug residue within 36 hours following the last installation. Indeed this is contrary to prior art teachings that a long residue pattern, i.e., protracted appearance of residual antibiotic, was requisite to proper therapy.

The composition of the medicinal preparation used in practicing the method of this invention is erythromycin base dissolved in a fatty acid triglyceride that is liquid at the temperature of anticipated use. Erythromycin base refers to that form of erythromycin where the amino nitrogen atoms are not protonated, as opposed to the so called acid-addition salt forms of erythromycin. The stability of erythromycin base is required both during storage and use. It has been found that the stability decreases as the degree of fatty acid unsaturation increases. This makes it necessary to select a fatty acid triglyceride so that the fatty acid is sufficiently saturated to yield a stabilized solution. It has further been found that if the fatty acid triglyceride has an iodine value less than 42, a sufficient and desirable degree of stability is attained.

Most satisfactory are those fatty acid triglycerides wherein each of the fatty acid moities has from 8 to about 10 carbon atoms and the iodine value is less than 5.

The preferred solution comprises partially hydrogenated coconut oil, having an iodine value within the previously specified limitation. Such an oil is sold under the trademark Neobee M-5 by Drew Chemical Company, New York, N.Y.

The erythromycin base is dissolved in the oil at a concentration of from about 10 to about 200 mg/ml of solution.

These homogenous solutions are not only more stable than other solvents or suspending agents for erythromycin base, but have the further advantage that they can be filtered to free them from bacteria. This yields an essentially sterile product.

If desired, one can add small amounts of antioxidants to achieve even increased stability. A preferred solution consists of the following.

This amount of solution after sterilization if desired can be packaged in a disposable syringe. Thus, a single dose will comprise 300 mg of erythromycin. While this dose is preferred, a dosage of from 100–500 mg of erythromycin is effective and well tolerated.

The method of administering the medicinal preparation of this invention will now be described.

Each infected quarter of an udder into which one intends to install the medicinal preparation is thoroughly milked out. The udder and teats are then cleaned by conventional washing techniques. Each of teat orifice into which installation is to be accomplished is disinfected preferably by swabbing with cotton soaked in ethanol or other suitable disinfectant. So as to avoid recontamination it is suggested that the teats farthest from the operator be disinfected first.

Then a suitable container such as a syringe or tube nozzle containing the hereinbefore described stable and sterile medicinal preparation is inserted into the teat orifice, starting with those nearest the operator if more than one quarter is to be treated. The contents of the container are infused into the infected quarter. The nozzle or syringe of the container is then removed and the teat orifice gently closed and the udder massaged to distribute the medicinal preparation.

When lactating cows are treated, it is preferred that the treatment be repeated following three consecutive milkings.

It has been found, as reported in Table I, that relatively high concentrations of erythromycin occur in udder tissue following the intramammary infusion of a 1200 mg dose to normal lactating dairy cows. It is particularly interesting to note that drug distribution occurred fairly uniformly between front and rear quarters and throughout the upper portion, as well as the lower third of the glands. The udder tissue fluid samples, referred to in Table I, are considered to be derived primarily from fluids collected fromt the duct system. These data indicate erythromycin distributes rapidly and uniformly throughout the milk duct system.

TABLE I
Erythromycin Concentration in Bovine Milk and Udder Tissue
(mcg/ml of Fluid or mcg/gm of Wet Tissue)

| Sample Period | Cow No. | Milk | Udder Tissue Fluid | | | | Drained Udder Tissue | | | |
|---|---|---|---|---|---|---|---|---|---|---|
| | | | Upper 1/3 | | Lower 1/3 | | Upper 1/3 | | Lower 1/3 | |
| | | | Front | Rear | Front | Rear | Front | Rear | Front | Rear |
| Pre-Infusion: | 89 | <.0146 | <.022 | <.022 | <.022 | <.022 | <.135 | <.135 | <.135 | <.135 |
| Post Infusion: | | | | | | | | | | |
| 2 hours | 91 | 185.0000 | 79.000 | 10.500 | 53.200 | 41.200 | 34.600 | 23.800 | 26.200 | 34.300 |
| 6 hours | 74 | 306.0000 | .857 | 1.750 | 12.900 | 23.700 | .917 | .958 | 3.670 | 14.300 |
| 12 hours | 130 | 21.7000 | .185 | .430 | 2.500 | 2.850 | .170 | .175 | 1.530 | 3.300 |
| 24 hours | 136 | .0550 | <.020 | <.020 | .031 | <.020 | <.135 | <.135 | <.135 | <.135 |
| 36 hours | 3 | <.0146 | <.020 | <.020 | <.020 | <.020 | <.135 | <.135 | <.135 | <.135 |
| 48 hours | 129 | <.0146 | <.020 | <.020 | <.020 | <.020 | <.135 | <.135 | <.135 | <.135 |

The rapid rate of absorption of erythromycin is most critically demonstrated in Table II, where relatively high levels were observed at 2 hours in serum, liver, bile, kidney and urine.

TABLE II

Erythromycin Concentration in Bovine Fluids, Tissues and Feces
(mcg/ml Fluid or mcg/gm of Wet Tissue)

| Sample Period | Cow No. | Udder Lymph | Blood | Liver | Bile | Kidney | Urine | Muscle | Fat | Feces |
|---|---|---|---|---|---|---|---|---|---|---|
| Pre-Infusion: | 89 | <.050 | <.031 | <.160 | <4.00 | <.100 | <.75 | <.20 | <.10 | <.50 |
| Post Infusion: | | | | | | | | | | |
| 2 hours | 91 | 9.670 | .100 | .917 | 4.28 | .542 | 3.40 | <.20 | <.10 | <.50 |
| 6 hours | 74 | 5.830 | .177 | 2.080 | 5.40 | 1.040 | 10.30 | <.20 | .10 | 3.40 |
| 12 hours | 130 | .642 | <.031 | .282 | <4.00 | .180 | 3.51 | <.20 | <.10 | 2.65 |
| 24 hours | 136 | <.050 | <.031 | <.160 | <4.00 | <.100 | <.75 | <.20 | <.10 | <.50 |
| 36 hours | 3 | <.050 | <.031 | <.160 | <4.00 | <.100 | <.75 | <.20 | <.10 | <.50 |
| 48 hours | 129 | <.050 | <.031 | <.160 | <4.00 | <.100 | <.75 | <.20 | <.10 | <.50 |

It was found that erythromycin is not only dispersed in the gland duct system and absorbed into the local udder tissue, but broad distribution throughout other body tissues and fluids occurred. This distribution pattern is similar to that following parenteral administration.

It was observed that the highest levels in the local udder tissues occurred at the 2 hour sampling period, whereas the highest levels for blood, liver, bile, kidney, fat, and urine occured at the 6 hour sample period. The pattern of drug residue in the feces is particulary noteworthy since no level was detected at 2 hours, the peak level occurred at 6 hours, and a somewhat lower level found at 12 hours. This general distribution pattern observed for erythromycin follows kinetic principles of absorption, distribution and excretion.

The duration of residue was found to be short for all tissues. Milk and one udder tissue sample exhibited the last detectable residue at 24 hours. All other tissues were negative at 24 hours. It is of interest that no levels were detected in muscle, the primary edible tissue other than milk, at any sampling period.

Tables II, III and IV illustrate the residue in milk. It will be seen that there is virtually no residue in the milk taken 36 hours, that is the third milking following the last infusion of the erythromycin base solution.

In Table III, the average residue for animals treated according to this invention at three dosage levels is set forth.

TABLE III

ERYTHROMYCIN MILK RESIDUES

| Dosage | Number of Animals | Number of Quarters | Mean Erythromycin Conc. (mcg/ml) | | | | |
|---|---|---|---|---|---|---|---|
| | | | 12 hrs Post 1st Dose | 12 hrs Post 2nd Dose | Hours Post Last Dose | | |
| | | | | | 12 hrs | 24 hrs | 36 hrs |
| 100 mg Per Quarter Per Infusion | 42 | 106 | 3.60 (29) | 9.17 (29) | 2.56 (42) | 0.26 (13) | 0.28 (1) |
| 100 mg Per Quarter Per Infusion | 17 | 54 | 10.07 (17) | 17.73 (17) | 4.37 (17) | 0.20 (11) | Trace (1) |
| 500 mg Per Quarter Per Infusion | 4 | 10 | 3.03 (4) | 36.41 (4) | 1.57 (4) | 0.09 (2) | 0.00 |

Figures in parenthesis indicate number of animals exhibiting detectable levels of antibiotic.

Table IV illustrates the residue pattern for individual animals.

Table V shows the drug residue after the third milking at differing intervals.

tion of rom about 10 to about 200 mg/ml of solution in a fatty acid triglyceride having an iodine number less than 42; removing the infusion means, pressing closed the teat orifice and massaging the udder to thoroughly distribute the medicinal preparation.

TABLE IV

ERYTHROMYCIN MILK RESIDUES

Animal to Animal Variation

| Animal No. | No. of Studies | No. of Quarters | Erythromycin Concentration (mcg/ml) | | | | | | |
|---|---|---|---|---|---|---|---|---|---|
| | | | 1st Milking Post 1st Dose | 1st Milking Post 2nd Dose | No. of Milking Post Last Dose | | | | |
| | | | | | 1st Milking | 2nd Milking | 3rd Milking | 4th Milking | 5th Milking |
| 133 | 3 | 12 | 12.56 (3) | 13.59 (3) | 7.41 (3) | 0.30 (2) | 0.00 | | |
| 135 | 4 | 10 | 4.02 (4) | 27.70 (4) | 2.83 (4) | 0.27 (1) | 0.00 | | |
| 130 | 5 | 12 | 10.05 (5) | 20.90 (5) | 6.68 (5) | 0.48 (4) | <0.02* (1) | | |
| 128 | 4 | 8 | 0.62 (4) | 4.74 (4) | 0.25 (4) | 0.00 | | | |
| 129 | 5 | 10 | 1.24 (5) | 9.78 (5) | 1.05 (5) | 0.07 (1) | 0.00 | | |
| 131 | 5 | 12 | 0.66 (5) | 5.97 (5) | 0.36 (5) | 0.00 | | | |

*Trace level detected below sensitivity of analytical method.
Figures in parenthesis indicate number of animals exhibiting detectable erythromycin levels.

TABLE V

ERYTHROMYCIN MILK RESIDUES

Sampling Time Effect
Erythromycin Dosage—300 mg/quarter

| Sampling Sequence | No. of Animals | No. of Quarters | Erythromycin Concentration mcg/mg | | | | | | |
|---|---|---|---|---|---|---|---|---|---|
| | | | 1st Milking Post 1st Dose | 1st Milking Post 2nd Dose | No. of Milkings Post Last Dose | | | | |
| | | | | | 1st Milking | 2nd Milking | 3rd Milking | 4th Milking | 5th Milking |
| 15 and 9 Hr. Intervals | 6 | 10 | 4.00 (6) | 21.91 (6) | 3.06 (6) | 0.17 (3) | 0.00 | | |
| 12 Hr. Intervals | 11 | 44 | 13.39 (11) | 15.45 (11) | 5.09 (11) | 0.28 (8) | <0.02* (1) | | |
| 9 and 15 Hr. Intervals | 7 | 22 | 65.16 (7) | 13.95 (7) | 69.85 (7) | 0.45 (4) | 0.00 | | |

*Trace level detected below sensitivity of analytical method.
Figures in parenthesis indicate number of animals exhibiting detectable residue levels of erythromycin.

I claim:

1. A method of treating infectious bovine mastitis comprising the steps of milking a bovine host, injecting an infusion means into the teat orifice of an infected udder quarter, transferring a sterile stable homogenous medicinal preparation from said infusion means into the udder interior; said preparation comprising 100 – 500 mg of erythromycin base dissolved at a concentration of rom about 10 to about 200 mg/ml of solution in a fatty acid triglyceride having an iodine number less than 42; removing the infusion means, pressing closed the teat orifice and massaging the udder to thoroughly distribute the medicinal preparation.

2. A method according to claim 1 in which said milking infusion and massage steps are repeated for three consecutive milkings.

3. A method according to claim 1 in which said fatty acid triglyceride has an iodine number less than 5 and said fatty acid moities each have from 8–10 carbon atoms.

4. A method according to claim 1 in which said fatty acid triglyceride is a partially hydrogenated coconut oil.

* * * * *

UNITED STATES PATENT OFFICE
CERTIFICATE OF CORRECTION

Patent No. 3,780,737                    Dated December 25, 1973

Inventor(s) John Alexander Banford

It is certified that error appears in the above-identified patent and that said Letters Patent are hereby corrected as shown below:

Column 2, following line 23, please insert:

"Erythromycin Base                         300 mg
 Butylated Hydroxy Anisole                0.45 mg
 Butylated Hydroxytoluene                 0.45 mg
 Sufficient Neobee M-5 to produce 6.00 ml of solution"

Column 4, Table III, under the heading "Dosage":

Line 1, please delete "100" and substitute therefor "200"

Line 4, please delete "100" and substitute therefor "300"

Signed and sealed this 9th day of July 1974.

(SEAL)
Attest:

McCOY M. GIBSON, JR.                C. MARSHALL DANN
Attesting Officer                   Commissioner of Patents